United States Patent
Bellouard et al.

(10) Patent No.: US 7,253,946 B2
(45) Date of Patent: Aug. 7, 2007

(54) MICROSCOPE WITH EXTENDED FIELD OF VISION

(75) Inventors: Yves Bellouard, Albany, NY (US); Benjamin Michael Potsaid, Troy, NY (US); John T. Wen, Melrose, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 273 days.

(21) Appl. No.: 10/525,422

(22) PCT Filed: Sep. 15, 2003

(86) PCT No.: PCT/US03/29332

§ 371 (c)(1),
(2), (4) Date: Feb. 24, 2005

(87) PCT Pub. No.: WO2004/025331

PCT Pub. Date: Mar. 25, 2004

(65) Prior Publication Data

US 2005/0243412 A1 Nov. 3, 2005

(51) Int. Cl.
*G02B 21/00* (2006.01)
*G02B 21/36* (2006.01)

(52) U.S. Cl. ............. 359/368; 359/363; 359/740; 382/128; 382/133

(58) Field of Classification Search ........ 359/368–390, 359/363, 738–740, 200–214; 348/79; 250/201.3, 250/238
See application file for complete search history.

(56) References Cited

U.S. PATENT DOCUMENTS

| | | | | |
|---|---|---|---|---|
| 3,643,015 A | * | 2/1972 | Davidovits et al. | 348/79 |
| 4,673,988 A | * | 6/1987 | Jansson et al. | 358/453 |
| 5,672,880 A | * | 9/1997 | Kain | 250/458.1 |
| 6,101,265 A | | 8/2000 | Bacus et al. | 382/133 |
| 6,226,392 B1 | | 5/2001 | Bacus et al. | 382/128 |
| 6,248,995 B1 | * | 6/2001 | Tanaami et al. | 250/234 |
| 6,272,235 B1 | | 8/2001 | Bacus et al. | 382/133 |
| 6,313,452 B1 | * | 11/2001 | Paragano et al. | 250/201.3 |
| 6,335,824 B1 | * | 1/2002 | Overbeck | 359/368 |
| 6,433,907 B1 | | 8/2002 | Lippert et al. | 359/201 |
| 6,433,929 B1 | * | 8/2002 | Sasaki | 359/388 |
| 2004/0119817 A1 | * | 6/2004 | Maddison et al. | 348/79 |

* cited by examiner

*Primary Examiner*—Thong Q Nguyen
(74) *Attorney, Agent, or Firm*—Notaro & Michalos PC

(57) ABSTRACT

An optical system is provided for creating a mosaic image of a large field of view through a microscope at fast refresh rates of about 25 Hz with a high resolution that is free of blurring or aberrations. The optical system includes an objective lens assembly (20), an iris (30), one or more scanning mirrors (40) for high-speed scanning, one or more imaging lenses and irises (50, 60, 80), and a high-speed imaging device (70) arranged in that order from an object. The optical system also includes a mechanism for processing and constructing scanned and captured images into a mosaic image.

24 Claims, 5 Drawing Sheets

MICROSCOPE WITH EXTENDED FIELD OF VISION

FIELD AND BACKGROUND OF THE INVENTION

The present invention relates generally to the field of microscopy and in particular to a new and useful apparatus and method for high-speed image scanning, image capturing, and mosaicking to enlarge the field of view with respect to microscopic objects.

A microscope is an indispensable tool for micro-assembly and micro-manipulation. However, conventional microscopes suffer from the limitation that high magnification reduces the size of the field of view, which is the maximum object size which may be imaged by a lens. As a result, many micro-assembly or micro-manipulation tasks that require micron to sub-micron precision over millimeter work volume are beyond the capability of fixed optical microscopes.

For example, in vitro fertilization requires the manipulation of two microscopic biological cells, a spermatazoid and an ovule. The two biological cells may be separately located in two different zones of interest on a biological plate. If a first zone of interest is magnified for viewing and manipulation of one biological cell, a biological cell located at a distant second zone of interest may fall outside the field of view of the first zone of interest. This is especially problematic where the biological cell at the second zone of interest is moving.

Another example involves micro-assembly by mobile robot using relative positioning. Stick-and-slip microrobots for instance offer a very high relative accuracy (a few nm) in a large working space. However, high resolution sensors that can work on a large scale are usually expensive and volume-consuming. Moreover, one sensor is required for each degree of freedom. One way to reduce the number of sensors is to use multi-dimensional sensors. Using a pattern-matching algorithm, it is possible to track the motion of an object via a CCD-camera looking through a microscope.

The accuracy of this sensing method depends on magnification but an accuracy of half a micron to a quarter of micron can be reasonably achieved. X and Y movement and rotation can be sensed without defocusing the microscope and the Z position can be obtained by focusing-defocusing the picture. However, the working volume will be limited to the size of the picture itself which is a problem if accuracy is required. If the robot has to perform a task like a pick-and-place manipulation this volume may not be large enough. The whole assembly setup might have to be moved under the microscope which may be a problem if delicate assembly is required.

A common solution to the problem of reduced field of view is to move the platform supporting the sample or to move the microscope itself. The bandwidth of the motion is limited by the inertia of the platform or microscope, and the vibration resulting from the motion can blur the image or even modify the scene.

Mosaicking, or forming a single large image from smaller images, is used in applications such as NASA planetary flybys and photo-stitching software in some consumer digital cameras. However, implementation of mosaicking for performance of dynamic micro-assembly and micro-manipulation tasks with real-time vision guidance requires an optical system with a sufficiently fast refresh rate. Confocal microscopes employ high speed scanning to form images but only a single pixel data is obtained at each scan.

Similarly, U.S. Pat. No. 6,433,907 to Lippert et al. teaches a display apparatus that includes a scanning assembly that scans a plurality of light beams produced from spatially distinct regions, in a raster pattern. The scanning assembly includes mirrors that pivot to sweep the beams. Beam color and intensity is modulated to form a respective pixel of an image. By properly controlling the color and intensity of the beam for each pixel location, the display can produce a contiguous image from the pixels from each distinct region. Like confocal microscopes, the Lippert '907 apparatus involves acquisition of single pixel data, or pixel-by-pixel scanning.

U.S. Pat. No. 6,313,452 to Paragrano et al. discloses a microscopy system that utilizes a plurality of images to create a single mosaic image. The system comprises a stage, at least one magnifying lens, a lens controller, a video capture device, and a processing subsystem. However, no high-speed scanning or capture devices are included.

U.S. Pat. Nos. 6,101,265 and 6,226,392 both to Bacus et al. teach an apparatus and method for acquiring and storing multiple images from a specimen via a microscope and digital scanner, and providing a user a reconstructed image of the entire specimen at low magnification. The reconstructed image is formed of a large number of tiled images which are coordinated and assembled to form the reconstructed image. High-speed scanning, imaging, and refreshing are not taught.

U.S. Pat. No. 6,272,235 also to Baccus et al. further teaches that acquired images are coherently seemed together to provide virtual digitized images at either at low or high resolution. A data structure is formed with the virtual digitized images along with their mapping coordinates. The data structure is formed with compressed data so that it can be transmitted over low bandwidth channels, such as the Internet, without loss of resolution.

An optical system is needed that addresses the field of vision limitations of conventional microscopes without movement of the microscope stage or sample. The optical system should be capable of capturing images at fast refresh rates so that a virtual reconstructed image can be constructed quickly, where a view of the reconstructed image cannot be differentiated from the specimen view by the human eye. Such an optical system thereby overcomes the disadvantages of traditional motorized stages which are significantly slower. The optical system should be capable of scanning images which are focused and undistorted. Image processing in stitching the images together should be performed without any particular imaging algorithms.

SUMMARY OF THE INVENTION

It is an object of the present invention to create a mosaic image, or select portions of a mosaic image, of a large field of view through a microscope at fast refresh rates.

It is another object of the present invention to provide a mosaic image with a high resolution that is free of blurring or aberrations.

It is yet another object of the present invention that the mosaic view be formed by stitching smaller images together on the fly.

It is yet another object of the present invention to provide for a virtual enhancement in resolution by combining several overlapping images of the same scene.

Accordingly, an optical system is provided for enlarging the field of view with respect to an object by high-speed scanning, image capture, and image mosaicking along an optical path. The optical system includes one or more lenses forming an objective lens assembly positioned downstream from the object along the optical path so that the object is positioned at a focal plane of the objective lens assembly. The purpose of the objective lens assembly is to collect the light from the specimen and to bend to light rays to form collimated or nearly collimated light beams. By collimated or nearly collimated, it is meant that the back focal distance of the objective lens assembly be in the range of 50 mm to infinity. A back focal distance of infinity means that the light is perfectly collimated.

The optical system further includes an iris downstream from the objective lens assembly, one or more galvanometric scanning mirrors placed downstream from the iris for high-speed scanning, one or more imaging lenses, such as a converging lens and a diverging lens combined with an iris, downstream of the galvanometric scanning mirrors, and a high-speed digital imaging device downstream of the imaging lenses. The optical system also includes a means for processing and constructing scanned and captured images into a mosaic image on the fly without any particular imaging algorithms.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
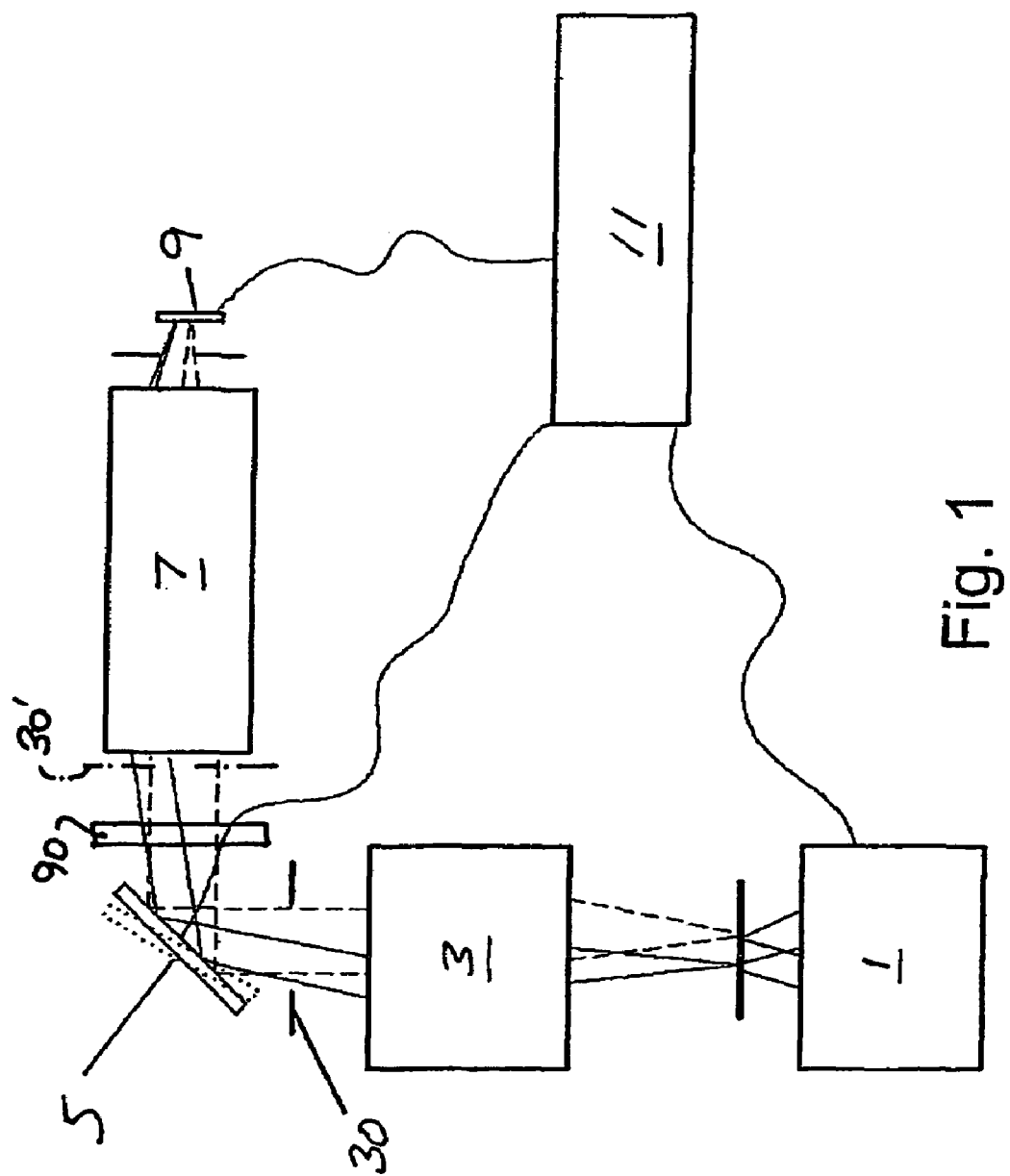
FIG. 1 is a schematic diagram of a first embodiment of the optical path of the invention.

Referring now to the drawings, in which like reference numerals are used to refer to the same or similar elements, FIG. 1 shows an optical system.

The optical system can be divided into six elements. The first element is an illumination system 1. A specimen can be illuminated from the bottom due to a dedicated illumination system. It can also be illuminated from the top due to a light beam injected into the optical path. Another possibility is side illumination using fiber bundles for instance.

The second element is an objective lens assembly 3 that consists of one or more lenses. An object is placed at the focal plane of the lens assembly such that each ray emitting off the same point on the object exit parallel to each other from the lens assembly. One or more lenses in the assembly can be moving to achieve a specific function like focusing or aberration compensation.

An iris 30 is placed just after the lens assembly to enhance image contrast. Other features like polarizers, quarter-wave plates or filters may also be placed just after the lens assembly to modify some characteristics of the light passing through it such as polarization.

The third element is a scanning system 5. It consists of one or several mirrors assembled such that any ray reflecting on the mirrors with a given angle, can be reflected off at another angle in a controllable manner.

The fourth element is an imaging lens assembly 7. The imaging lens assembly 7 consists of one or more lenses such that any beam of parallel rays is focused on a single point in the imaging plane. The fourth element has the opposite function of the second element. This iris may be combined with the imaging lens assembly 7 at 30'.

The fifth element is an imaging device 9 that can collect photon intensity and/or photon frequencies and/or the difference of phase with a reference signal and/or the polarization. Examples of device 9 are Charge Coupled Devices (CCD) or CMOS sensors, a second iris, a filter, a polarizer or any optical device that modify wave characteristics such that the polarization, the phase or the wavelength could be used to achieve a particular image quality.

Finally, the sixth element is a processing unit 11. This unit can be one or more computers or any stand-alone system or set of hardware capable of controlling the mirrors position in real-time, grabbing pictures or any set of collected data from the imaging device 9, and eventually modulating the illumination on the specimen in a synchronized manner with the mirror motion and tuning the aperture of the iris and/or the orientation of the polarizers and/or the type of filters in real-time. The processing unit 11 further processes the acquired data and/or reconstructs an enlarged field of view, and provides a user interface through either a screen or a data port.

Figure 2:
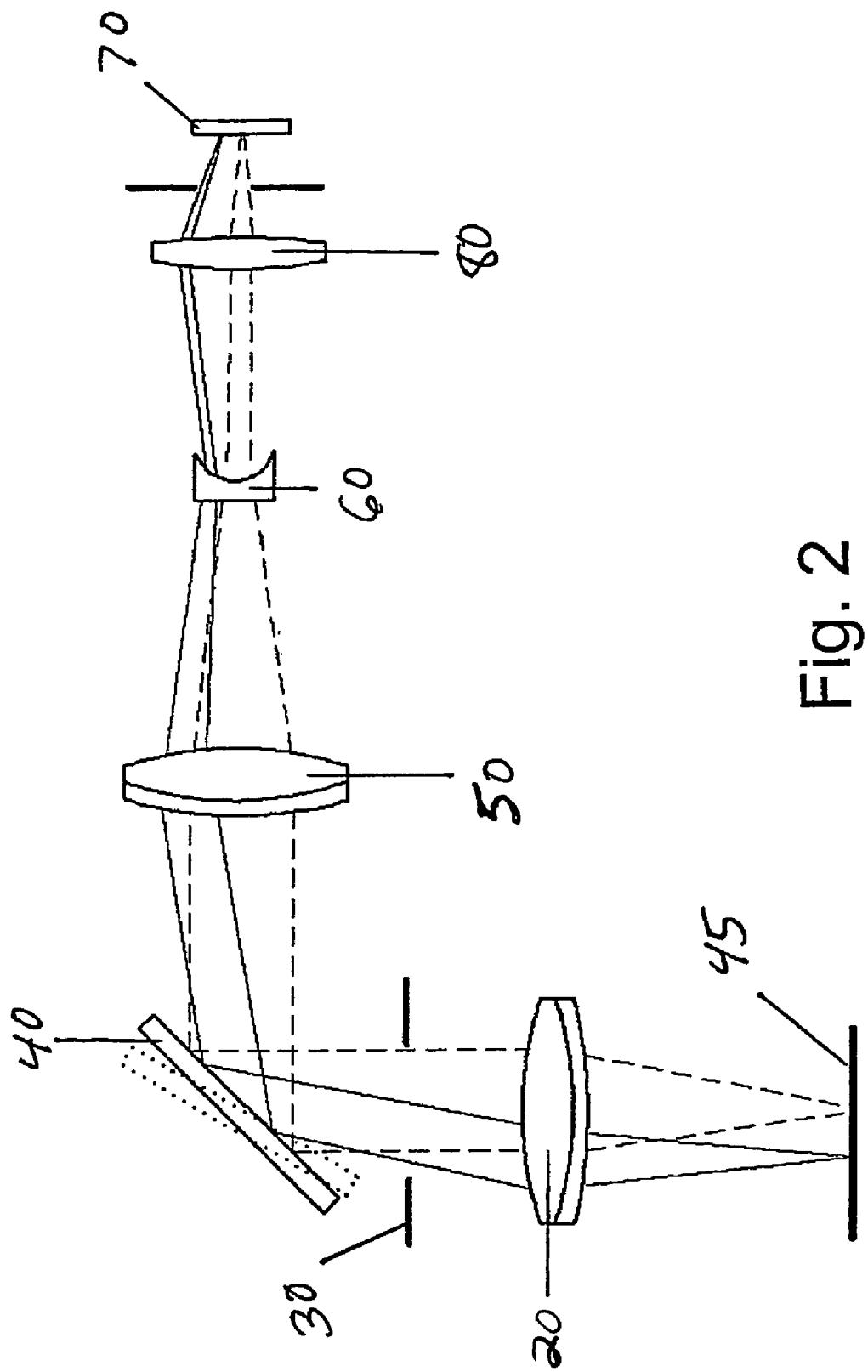
FIG. 2 is a schematic diagram of a second embodiment of the optical path of the invention.

FIG. 2 shows another exemplary embodiment of the optical system which can be divided into three sections. The first section has the main purpose of scanning, and in its simplest form, includes an objective lens 20, an iris 30, and high-speed scanning mirrors 40. An object 45 is placed at the focal plane of lens 20 such that each ray reflecting off the object is collimated at the scanning mirrors 40 which is downstream from the lens 20 and an iris 30. The iris 30 is placed just after the lens 20 to enhance image contrast.

A second section designed for the purpose of image capture, conditions the image according to the required performance such as the desired magnification and digital imaging size. A Galilean-like optical system (5 times ratio) is used, which consists of a converging lens 50 and a diverging lens 60 downstream from the scanning mirrors 40. Further downstream, rays exit parallel to the Galilean expander and form an image on the high-speed digital imaging device 70 by means of a fourth lens 80.

Figure 3:
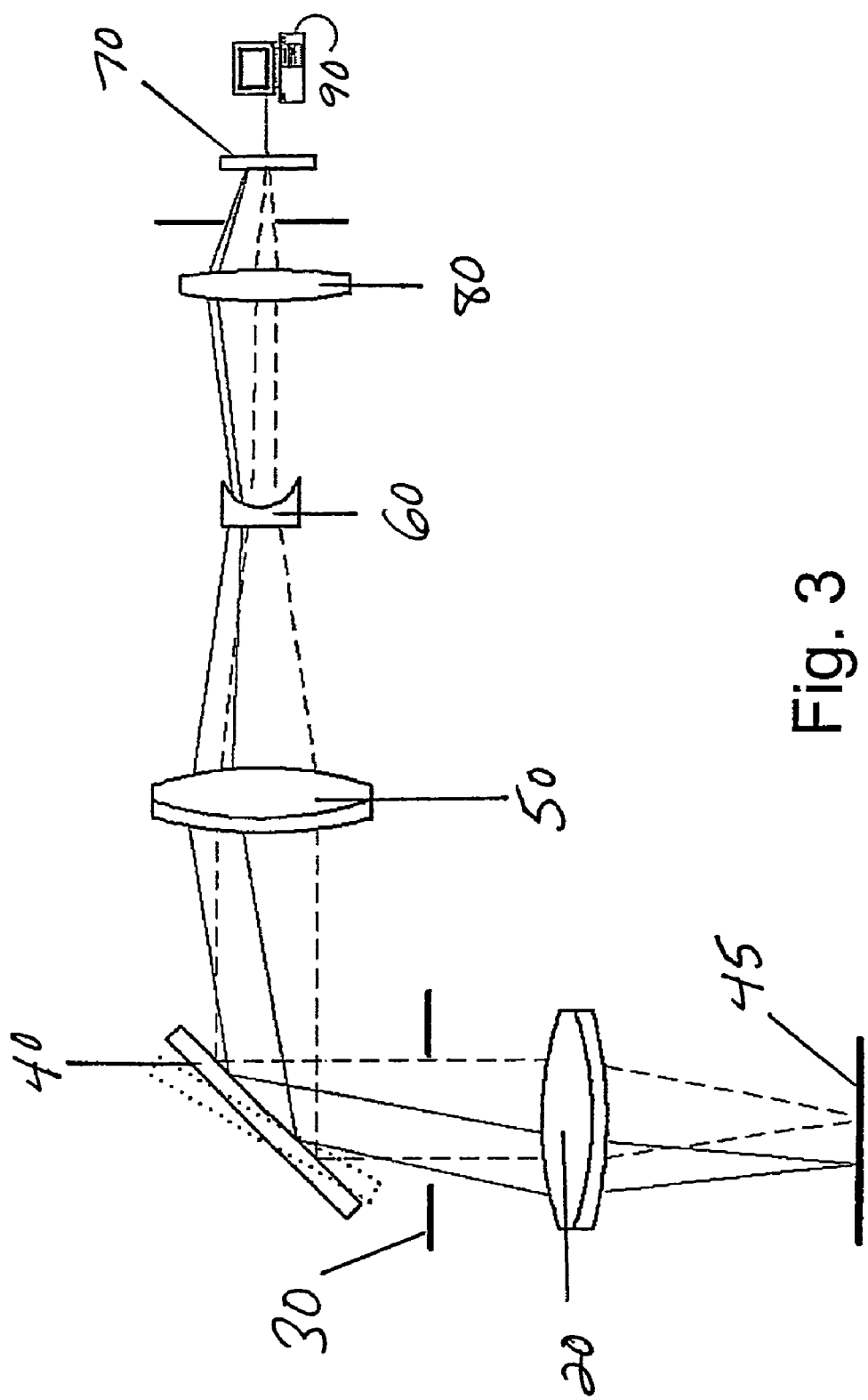
FIG. 3 is a schematic diagram of the optical path of the invention, including a computer.

A third section is designed for processing and constructing the captured images of the digital imaging device into a mosaic image. The third section includes a computing device 90 with software as shown in FIG. 3. Construction of the mosaic image involves use of a frame grabber for acquiring the images from the high-speed digital imaging device 70, a dedicated algorithm for organizing, processing, and constructing the mosaic image, and pattern recognition for synchronization of the images. The scanning pattern as well as integrated manipulation is also preferably shared through a network such as the Internet allowing collaborative observation and manipulation.

In one preferred embodiment of the present invention, lens 20 is an achromat lens with a focal length ranging from about 25 mm to 75 mm, and most preferably about 50 mm, and a diameter ranging from about 10 mm to 40 mm, and most preferably about 25.4 mm. Achromat lenses are preferred to minimize or eliminate chromatic aberrations from the resulting images.

The scanning mirrors 40 are a moving mirror $\theta_x\theta_y$ galvanometer system which is placed in the optical path for the purpose of optical scanning. A galvanometer is an electromagnetic actuator, similar in principle to a DC motor, but with no commutation, so the amount of shaft rotation is limited to about 20 degrees. A mirror is mounted on the output shaft of the galvanometer to reflect and direct the light beam coming from the objective lens assembly to the imaging lens assembly. Such galvanometers can achieve millisecond settling time over small motion ranges. It is further noted that the scanning mirrors 40 is self-contained and portable so that it can be inserted into the optical path over any type of sample.

The illumination system could also be synchronized with the scanning system such that only a selected region of the specimen is locally illuminated. The intensity could also be modulated to provide for uniform lighting regardless of mirrors positions and associated optical imperfection. This could be achieved with an appropriate feedback system or through an appropriate calibration.

The scanning mirrors 40 operate at a speed to allow ample time to settle to prevent image blur, the optical system has only minimal complexity, and image acquisition is based on readily available software. A program, which can be written in any programming language, including C++, is used to coordinate the motion control with the image acquisition and image processing. After initial startup and during the process of image acquisition, the scanning mirrors operate at a speed within the range of 0-300 tiles per second, and most preferably as fast as 0-250 tiles per second. That is, to construct a 5×5 mosaic of tiles, the entire 5×5 mosaic can be refreshed at a rate of 10 complete mosaics per second. As a result, the bulk of the operation time at the present is spent on image acquisition and processing. The scanning motion is preferably programmed for rapid tracking of multiple, and possibly disconnected, events. The motion of the scanning mirrors 40 is coordinated to create subpixel accuracy.

The capability of positioning the center of the field of view with subpixel accuracy allows multiple images to be taken of the same scene from slightly different angles. The data from the multiple images can be combined to form an image with a virtual resolution higher than the optical and imaging resolution by means of super resolution image processing algorithms. As an example of this technique, super resolution image processing algorithms are used by law enforcement agencies to create high resolution images of a license plate from multiple frames of low resolution video footage of the license plate taken from slightly different angles as the car drives away.

But it is noted that since the optical layout allows scanning without disturbing the specimen, there are applications where the user would want to scan slower than 250 image tiles per second to reduce the amount of raw image data that must be stored (large population study of a slow biological process would be an example).

Converging lens 50 has a focal length between about 25 mm and 75 mm, and most preferably about 50 mm, and a diameter between about 10 mm and 40 mm, and most preferably about 25.4 mm. Diverging lens 60, which is downstream of the converging lens along the optical path, has a focal length between about 3 mm and 15 mm, and most preferably about 9 mm, and a diameter between about 3 mm and 15 mm, and most preferably about 9 mm. The fourth lens 80, which is downstream of the diverging lens, is preferably a biconvex lens and has a focal length between about 25 mm and 500 mm, and most preferably about 100 mm. Lens 80 also has a diameter between about 5 mm and 200 mm, and most preferably about 15 mm.

Images scanned by the scanning mirrors 40 are captured from the scanner via the high-speed digital imaging device 70 which is preferably a charge-coupled device ("CCD") camera. The CCD then relays the images to a processing unit 11 such as a computer 90 for processing the images and constructing a mosaic image representing the scene viewed under the microscope.

The motion of the scanning mirrors 40 is coordinated with image capture to enable precise image alignment during the mosaic forming process. Therefore, the processing unit can accomplish stitching on the fly without any particular imaging algorithms. As compared to traditional mosaicking methods that use features in the image for alignment, and require time consuming stitching algorithms, the subpixel positioning accuracy of the current invention allows for a very quick direct memory copy. It is noted that traditional mosaicking algorithms can be applied, at a cost to image acquisition speed, but with a potential increase in image alignment quality.

Figure 4:
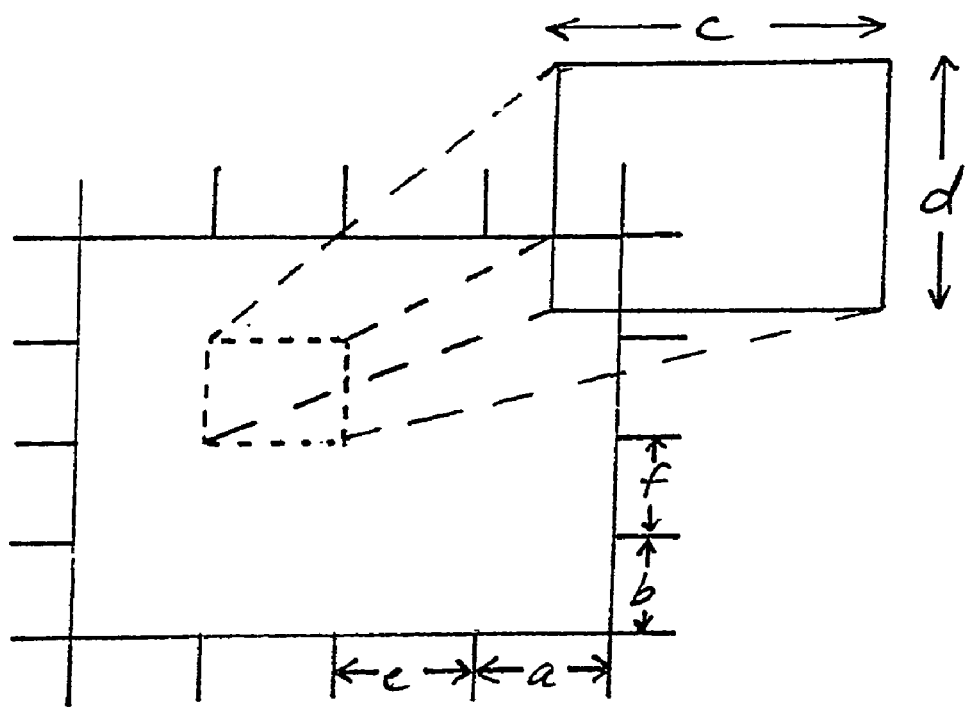
FIG. 4 is a schematic diagram of the dimensions of a mosaic image achieved by the present invention.

As shown in FIG. 4, the preferred embodiment of the invention produces a mosaic image that is 4×4, wherein an image area of each dimension, defined by a×b, is 2 mm×1.5 mm and an overall field of view is 8 mm×6 mm, as defined by c×d, at a resolution of 6.25×6.25 $\mu m^2$/pixel, or 320×240, as defined by e×f. It is noted that the dimensions and image sizes specified above will depend on the selection of digital imaging device and the lens combination chosen for the specific imaging task at hand. As is common in microscopy, the camera's pixel density and the lens combination are selected to provide the appropriate magnification. Similarly, the size of the mosaic image will depend on the task at hand and can be generalized to be m tiles wide by n tiles high (m×n).

Figure 5:
FIG. 5 is a diagram that shows a field of view that has been enlarged via mosaicking.

As shown in FIG. 5, a field of view 100 is enlarged wherein the pieces Q, R, S, T, U, V are mosaicked to produce a mosaic image 110.

Although a preferred embodiment has been shown, the invention is not limited to the lens and image parameters and measurements which have been provided. Both optical and mechanical design parameters of the system may be optimized to improve image acquisition, processing, image resolution and field of view.

To improve the overall image quality or to achieve imaging performance specifications, different lens assemblies could potentially be used for the objective lens assembly as well as for the imaging lens assembly. Configurations known as Petzval, Telephoto, Zeiss Tessar, Cooke Triplet or F-Theta are among the candidates. The book Optical System Design from R. Fischer and Biljana Tadic-Galeb published by SPIE-Press/McGraw Hill (ISBN 0-07-134916-2) gives an overview of these systems (see in particular pages 130 to 139).

With regard to optical design parameters, the size, shape and distance from the object to lens 20 or lens assembly 3, will directly affect the size of the field of vision as well as the image quality (such as optical aberrations, image distortions, etc.) as the system is working off the optical axis.

With regard to mechanical design parameters, the settling time of the scanner will define the refresh rate. Many of these parameters are closely related. For example, a larger mirror will allow, among others, a larger field of vision but at the cost of a longer settling time and therefore a lower refreshing rate. A larger CCD array provides higher image resolution but requires more data transfer and image processing time.

A target refresh rate is 25 Hz or 0 Hz to 25 Hz. The refresh rate is fast for a number of reasons, including high-speed scanning and low inertia of the scanning mirrors 40 and digital imaging with a high-speed CCD or CMOS camera. Also, any motion errors that are produced, occur after the objective lens 20, and therefore, such errors are not magnified, as compared to moving stages, in which error or oscillation in the stage motion is magnified together with the sample. Because error is not magnified and the scanning mirror position is accurate, scanned and captured images do not need to be stitched together with software, but can be directly placed next to each other with subpixel accuracy, permitting faster refresh rates and more time for image processing. The scanning pattern is also adapted to the regions of interest in order to obtain the highest refresh rates.

The timing budget for a complete image is 40 ms. Factors which contribute to the time consumption are scanner motion (including motion profile generation and physical movement from one scan area to the next), and image acquisition and processing. These two operations can be executed in parallel since they involve different processors.

Although specific embodiments have been shown for microscopic applications, the invention is not limited to those embodiments and may be used in macroscopic applications such as law enforcement or other large scale image capturing applications.

In one alternative embodiment of the invention, other optical systems such as a laser beam schematically shown at 90 in FIG. 1, can be injected between the scanning and image capture optical sections to perform different functions like machining, manipulation, heating, cutting, welding or fluorescent stimulation simultaneously with the imaging.

While a specific embodiment of the invention has been shown and described in detail to illustrate the application of the principles of the invention, it will be understood that the invention may be embodied otherwise without departing from such principles.

What is claimed is:

1. An optical system for enlarging a field of view with respect to an object by high-speed scanning, image capture, and image mosaicking along an optical path, comprising:
   an objective lens or lens assembly positioned downstream from the object along the optical path so that the object is positioned at a focal plane of the objective lens or lens assembly;
   an iris downstream from the objective lens or lens assembly along the optical path;
   one or more scanning mirrors placed downstream from the iris along the optical path for optical high-speed scanning;
   one or more imaging lenses downstream of the scanning mirrors along the optical path;
   a high-speed digital imaging device downstream of said one or more imaging lenses along the optical path; and
   means for processing and constructing scanned and captured images into a mosaic image.

2. An optical system according to claim 1, further comprising a laser in the optical path between the scanning mirrors and imaging lenses.

3. An optical system according to claim 1, wherein the system has a refresh rate in the range of 0 Hz to 25 Hz.

4. An optical system according to claim 1, wherein the objective lens is an achromat with a focal length of about 50 mm, and a diameter of about 25.4 mm.

5. An optical system according to claim 1, wherein the imaging lenses are a converging lens with a focal length of about 50 mm, and a diverging lens downstream of the converging lens along the optical path with a focal length of about 9 mm.

6. An optical system according to claim 5, wherein the converging lens has a diameter of about 25.4 mm, and the diverging lens has a diameter of about 9 mm.

7. An optical system according to claim 1, wherein the high-speed digital imaging device is a charge coupled device or complementary metal oxide semiconductor camera.

8. An optical system according to claim 1, wherein the mosaic image is 4×4, with an image area of each dimension being 2 mm×1.5 mm and an overall field of view being 8 mm×6 mm at a resolution of 320×240.

9. An optical system according to claim 1, wherein the system completes a mosaic image in 40 ms.

10. An optical system according to claim 1, wherein the one or more imaging lenses are combined with an iris.

11. An optical system according to claim 1, further comprising an illumination system upstream of the object.

12. An optical system for enlarging a field of view with respect to an object by high-speed scanning, image capture, and image mosaicking along an optical path, comprising:
    an objective lens assembly positioned downstream from the object along the optical path so that the object is positioned at a focal plane of the objective lens assembly;
    an iris downstream from the objective lens assembly along the optical path;
    one or more galvanometric scanning mirrors placed downstream from the iris along the optical path for optical high-speed scanning;
    one or more imaging lenses downstream of the galvanometric scanning mirrors along the optical path;
    a high-speed digital imaging device downstream of said one or more imaging lenses along the optical path; and
    means for executing a dedicated algorithm for processing and constructing scanned and captured images into a mosaic image.

13. An optical system according to claim 12, wherein the objective lens is an achromat lens.

14. An optical system according to claim 12, wherein the system has a refresh rate of 25 Hz.

15. An optical system according to claim 12, wherein the high-speed digital imaging device is a charge coupled device or complementary metal oxide semiconductor camera.

16. An optical system according to claim 12, wherein the mosaic image is 4×4, with an image area of each dimension being 2 mm×1.5 mm and an overall field of view being 8 mm×6 mm at a resolution of 320×240.

17. An optical system according to claim 12, wherein the means for executing a dedicated algorithm is a computer.

18. An optical system according to claim 12, wherein the one or more imaging lenses are combined with an iris.

19. An optical system according to claim 12, further comprising an illumination system upstream of the object.

20. A method for enlarging a field of view with respect to an object along an optical path, comprising the steps of:

placing an object at a focal plane of an objective lens so that rays reflecting off the object are collimated at scanning mirrors placed downstream from the objective lens along the optical path;

acquiring images of different segments of the object by scanning the reflected rays with the scanning mirrors at a high speed;

forming an image onto a digital imaging device from the images acquired by the scanning mirrors; and constructing a mosaic image from images captured by the digital imaging device.

21. The method according to claim 20, wherein the method achieves a refresh rate of 25 Hz.

22. The method according to claim 20, wherein the method for producing the mosaic image is achieved in 40 ms.

23. The method according to claim 20, wherein the high-speed digital imaging device is a charge coupled device or complementary metal oxide semiconductor camera.

24. The method according to claim 20, wherein the constructed mosaic image is 4×4, with an image area of each dimension being 2 mm×1.5 mm and an overall field of view being 8 mm×6 mm at a resolution of 320×240.

* * * * *